Jan. 7, 1969   HANS-JOACHIM M. FORSTER ET AL   3,420,251
CENTRIFUGAL REGULATOR FOR PRODUCING A PRESSURE IN DEPENDENCE
ON THE ROTATIONAL SPEED, ESPECIALLY FOR AUTOMATIC
MOTOR VEHICLE CHANGE-SPEED TRANSMISSIONS
Filed Dec. 6, 1966

INVENTORS
HANS-JOACHIM M. FÖRSTER
ULRICH ELTZE

BY *Dicke & Craig*

ATTORNEYS

United States Patent Office 3,420,251
Patented Jan. 7, 1969

3,420,251
CENTRIFUGAL REGULATOR FOR PRODUC-
ING A PRESSURE IN DEPENDENCE ON THE
ROTATIONAL SPEED, ESPECIALLY FOR
AUTOMATIC MOTOR VEHICLE CHANGE-
SPEED TRANSMISSIONS
Hans-Joachim M. Forster and Ulrich Eltze, Stuttgart-
Riedenberg, Germany, assignors to Daimler-
Benz Aktiengesellschaft, Stuttgart-Unterturkheim,
Germany
Filed Dec. 6, 1966, Ser. No. 599,618
Claims priority, application Germany, Dec. 7, 1965,
D 48,845
U.S. Cl. 137—54         10 Claims
Int. Cl. G05d 13/08

ABSTRACT OF THE DISCLOSURE

A centrifugal regulator for producing a pressure increasing with increasing rotational speed, in particular for automatically shifted motor vehicle change-speed transmissions, which comprises several concentrically arranged flyweights constructed in a slide valve-like manner and provided with control edges for controlling the pressure medium, the flyweights being slidably arranged within a common sleeve member provided with control apertures which, in turn, is adapted to be displaced within the regulator housing against a spring force.

Background of the invention

Figure 1:
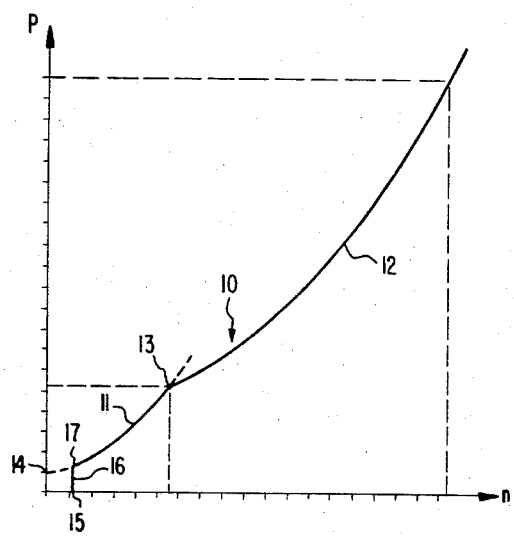

The present invention relates to a centrifugal regulator for producing a pressure increasing with increasing rotational speed, especially for vehicles, and in particular for automatically shifted motor vehicle change-speed transmissions, in which several flyweights provided with control edges, arranged concentrically within a rotating regulator housing and constructed in a slide valve-like manner, control the pressure medium, and in which one of these slide valve-like flyweights, upon exceeding a predetermined rotational speed, comes into abutment against a stop and thereby becomes ineffectual.

With a known centrifugal regulator of the aforementioned type, two flyweights are arranged concentrically to one another. One of these flyweights thereby comes into abutment against a stop or abutment rigid at the housing and thereby becomes ineffectual at a predetermined rotational speed. Both of the flyweights in the prior art regulator are supported within the housing. However, this prior art arrangement is disadvantageous insofar as no neatly controlled pressures result in the starting condition at low rotational speeds.

Summary of invention

The present invention aims at the elimination of the aforementioned disadvantage. More specifically, there exists the desire to create also at small or low rotational speeds clear pressure conditions and to maintain therewith the known subdivision of the regulator characteristic for purposes of approximation to as linear as possible a pressure curve. The present invention solves the underlying problems of the aforementioned arrangements in that the flyweights are arranged in a common sleeve member provided with the control apertures, which is adapted to move in the regulator housing against a spring force and which forms the abutment for a flyweight. Hence, the present invention starts with the general concept not to support directly the entire flyweight system as such within the housing but instead to combine all the flyweights by means of a common sleeve member and only to arrange the latter in its turn movably within the housing. It is achieved thereby that at a certain rotational speed which can be accurately controlled, the entire system jumps outwardly and thereby produces immediately or instantly a predetermined starting pressure. The regulator receives in this manner a clearly defined rotational response speed and from there on an unequivocally proceeding pressure increase.

Flyweights are known with a first flyweight constructed in a sleeve-like manner which includes the control piston actuated by the pressure medium and the control edges with a second flyweight which extends through the first flyweight and is resiliently supported with respect thereto. For such an arrangement, the present invention prefers a solution in which the sleeve member accommodating the two flyweights is supported by means of a coil spring with respect to a cover secured in the housing. This cover may be provided with a central aperture for the passage of the second flyweight. As a result thereof space is economized because the cover need not extend radially beyond the outermost position of the flyweight.

In one embodiment according to the present invention, a coil spring is arranged between the head portion of the second flyweight and the sleeve member which coil spring pulls or urges both flyweights outwardly in the direction of the centrifugal force against the pressure. The advantage is achieved thereby that the parabola characterizing the pressure curve does not pass through the zero point. Consequently, this means there is always a certain minimum pressure present to which the pressure jumps upon reaching the rotational response speed of the regulator.

According to the present invention, the second flyweight is provided at the radially inner end of its stem with a spring plate or spring disk, whereby a coil spring is arranged at the first flyweight between the spring disk and the bottom of the regulator piston. This coil spring determines in an analogous manner, as described hereinabove, the curve of the higher pressure parabola according to which proceeds the pressure after the elimination of the second flyweight. For purposes of this elimination of the second flyweight, the spring disk has a larger diameter than the spring and its projecting rim comes into abutment at the lower rim of the sleeve member.

Accordingly, it is an object of the present invention to provide a centrifugal pressure regulator of the type described above which eliminates by extremely simple means the aforementioned shortcomings and drawbacks encountered in the prior art constructions.

It is another object of the present invention to provide a centrifugal force regulator for producing a pressure in dependence on the rotational speed which enables a completely satisfactory and neat control of the pressure also low rotational speeds and thus assures clear pressure conditions at such low rotational speeds.

A further object of the present invention resides in a centrifugal regulator for controlling the pressure of a pressure medium in depedence on the rotational speed which establishes a clearly defined rotatontal response speed, assures a minimum of pressure and preserves an at least approximately linear pressure increase with increase in the rotational speed.

Figure 2:
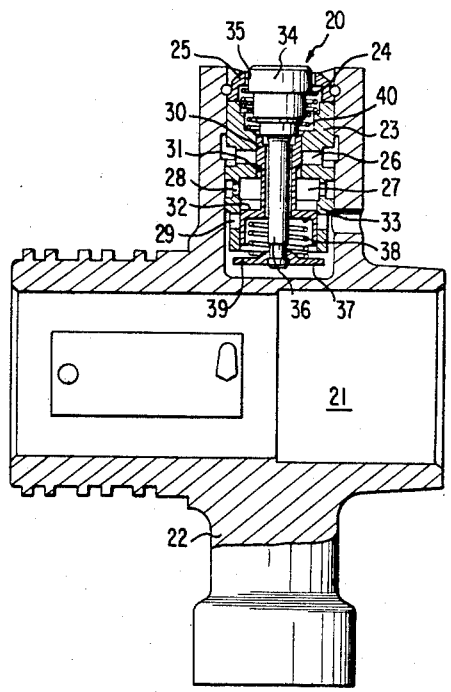

These and further objects, features, and advantages of the present invention will become more obvious from the following description when taken in connection with the accompanying drawing which shows, for purposes of illustration only, one embodiment in accordance with the present invention and wherein:

FIGURE 1 is a pressure diagram of a centrifugal regulator in accordance with the present invention; and FIGURE 2 is an axial cross-sectional view through a regulator in accordance with the present invention.

Referring now to the drawing, and more particularly to the diagram of FIGURE 1, the pressure curve generally designated by reference numeral 10 extends in the manner of two parabolas 11 and 12 which intersect at a point 13. The lower parabola 11 does not pass through the zero point but produces a predetermined starting pressure 14. The regulator itself, however, does not utilize this starting pressure but jumps upon reaching its rotational response speed 15 instantaneously along the line 16 to its minimum pressure 17 which is determined at this place by the parabolic curve. In the same manner, the higher parabola 12 analogously does not extend through the zero point. Altogether the pressure curve 10 produces an approximately linear curve over the entire rotational speed range.

According to FIGURE 2, the regulator generally designated by reference numeral 20 is arranged within a rotating housing 21 which may be arranged, for example, on the output shaft of an automatically shifted motor vehicle change-speed gear in a conventional manner not illustrated in detail. In order not to produce any imbalance, the centrifugal regulator 20 is equalized by the counter-weight 22.

The regulator 20 consists of a sleeve member 23 which is supported radially displaceably within the housing 21. The sleeve member 23 is supported by means of a spring 24 against a cover 25 which is secured within the housing 21 in any desired conventional manner. Consequently, the spring 24 presses the sleeve member 23 radially inwardly.

The sleeve member 23 is provided with control apertures 26 for the inflow of the pressure medium. Furthermore, the sleeve member 23 is provided with an interior space 27 which is in communication by way of apertures 28 with the controlled pressure line. In its lowest section are provided apertures 29 which represent the exhaust or discharge. Corresponding apertures or channels for the further conduction within the housing 21 are naturally associated with or coordinated to all of these control apertures. However, since such apertures or channels are of any conventional nature, they are not illustrated in the drawing for the sake of clarity.

A sleeve-shaped first flyweight 30 is supported within the sleeve member 23. The first flyweight 30 is provided with the control edge 31 for the pressure medium control at the inlet. At its lower end is located the pot-shaped regulating piston 32 which simultaneously forms the control edge 33 for the discharge. A second flyweight 34 whose head portion extends through an aperture 35 of the cover 25 is located concentrically within the first flyweight 30. The stem 36 of the second flyweight 34 is provided at the radially inner end thereof with a spring plate 37 secured thereto. A spring 38 is disposed between the spring plate 37 and the bottom of the regulating piston 32. The spring disk 37 is substantially larger in diameter than the spring so that it comes with its rim 39 into abutment against the sleeve member 23 upon reaching a predetermined rotational speed.

The operation of the regulator described hereinabove is self-evident. The regulating pressure builds up within the interior space 27 depending upon the centrifugal force. It is important in accordance with the present invention that at first during the starting the spring 24 retains the entire system in a radially inner position so that no pressure is adjusted thereby. Upon reaching a predetermined rotational response speed 15 (FIG. 1), the spring 24 is overcome and the entire system, consisting of the sleeve member 23 and of the two flyweights 30 and 34 flies outwardly. Furthermore, an additional spring 40 is arranged between the head portion of the flyweight 34 and the sleeve member 23. This spring effects the parabolic contour through the point 14 described in connection with FIGURE 1.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A centrifugal governor for producing a pressure increasing with increasing rotational speed, especially for vehicles, having a rotating regulator housing means and several substantially concentrically arranged slide-valve-like flyweight means arranged within said regulator housing means and provided with control edge means for controlling the pressure medium, wherein the improvement comprises common sleeve means for accommodating said flyweight means and provided with control aperture means, said sleeve means being movably arranged within said housing means against a spring force and forming an abutment for one of said flyweight means, and said one flyweight means coming into abutment against said sleeve means upon exceeding a predetermined rotational speed.

2. A centrifugal regulator according to claim 1, wherein said several flyweight means include a first sleeve-like flyweight and a second flyweight extending through the first flyweight and being resiliently supported with respect thereto, said first flyweight being provided with said control edge means and with a control piston means actuated by the pressure medium, cover means secured within said housing means, and coil spring means for supporting the sleeve means accommodating therewithin the two flyweights with respect to said cover means.

3. A centrifugal regulator according to claim 2, wherein said cover means is provided with a central aperture for the passage of the second flyweight.

4. A centrifugal regulator according to claim 3, wherein said second flyweight includes a head portion, and further coil spring means arranged between said head portion and the sleeve means and operable to pull outwardly the two flyweights in the direction of the centrifugal force against the pressure.

5. A centrifugal regulator according to claim 4, wherein the second flyweight is provided at the radial inner end of the stem thereof with a spring plate, and a further coil spring arranged between the spring plate and the bottom of the regulating piston means.

6. A centrifugal regulator according to claim 5, wherein said spring plate has a larger diameter than said further coil spring and the projecting rim thereof comes into abutment against said sleeve means.

7. A centrifugal regulator according to claim 2, wherein said second flyweight includes a head portion, and further coil spring means arranged between said head portion and the sleeve means and operable to pull outwardly the two flyweights in the direction of the centrifugal force against the pressure.

8. A centrifugal regulator according to claim 1, wherein one of said flyweight means is provided at the radial inner end thereof with a spring plate, and a spring arranged between the spring plate and the bottom of the other flyweight means.

9. A centrifugal regulator according to claim 8, wherein said spring plate has a larger diameter than said spring and the projecting rim thereof comes into abutment against said sleeve means.

10. A centrifugal regulator according to claim 1, wherein one of said flyweight means includes a head portion, and spring means arranged between said head portion and the sleeve means, said spring means being operable to pull outwardly the two flyweight means in the direction of the centrifugal force against the pressure.

References Cited

UNITED STATES PATENTS

| | | | |
|---|---|---|---|
| 2,876,784 | 3/1959 | Adams | 137—56 |
| 2,941,539 | 6/1960 | Hewko | 137—56 |
| 3,032,049 | 5/1962 | Schulz | 137—56 |
| 3,043,322 | 7/1962 | Schulz | 137—56 XR |
| 3,049,028 | 8/1962 | English et al. | 137—56 XR |
| 3,279,486 | 10/1966 | Duffy et al. | 137—56 XR |
| 3,302,659 | 2/1967 | Platz | 137—54 |

STANLEY N. GILREATH, *Primary Examiner.*

WERNER H. SCHROEDER, *Assistant Examiner.*

U.S. Cl. X.R.

137—56